May 22, 1934.  F. E. HENDERSON  1,959,426

CORE AND A METHOD OF MAKING CORES

Filed March 9, 1933

INVENTOR
F. E. HENDERSON
BY H. Q. Whitehorn
ATTORNEY

Patented May 22, 1934

1,959,426

UNITED STATES PATENT OFFICE 1,959,426

CORE AND A METHOD OF MAKING CORES

Fred E. Henderson, Riverside, Ill., assignor to Western Electric Company, Incorporated, New York, N. Y., a corporation of New York Application March 9, 1933, Serial No. 660,131

18 Claims. (Cl. 175—21)

This invention relates to cores and a method of making cores.

In the manufacture of electrical coils, such as inductances, transformers and the like, it is the practice in many instances to provide a hollow insulating core of rectangular or square cross-section upon which the coil may be wound; and after winding the coil, a magnetic core of similar cross-section is inserted in the hollow insulating core.

Objects of the invention are to provide a rugged and economical core and an effective and efficient method of making the core.

In accordance with one embodiment of the invention, the faces of the core are formed of phenol impregnated fiber faced with a sheet of cellulose acetate, the edges of which are bevelled and placed in abutting relation to form a core. The core is then served with a strip of cellulose acetate impregnated paper which has an adhesive coating of a solution of cellulose acetate in acetone applied thereto and is spirally wound over the core. The solvent of this solution plasticizes the cellulose acetate facing and upon drying unites the facings to form a strong and rigid core.

A complete understanding of the invention may be had by reference to the following description taken in conjunction with the accompanying drawing, in which Fig. 1 is a perspective view of a core embodying the invention;

Figure 1:
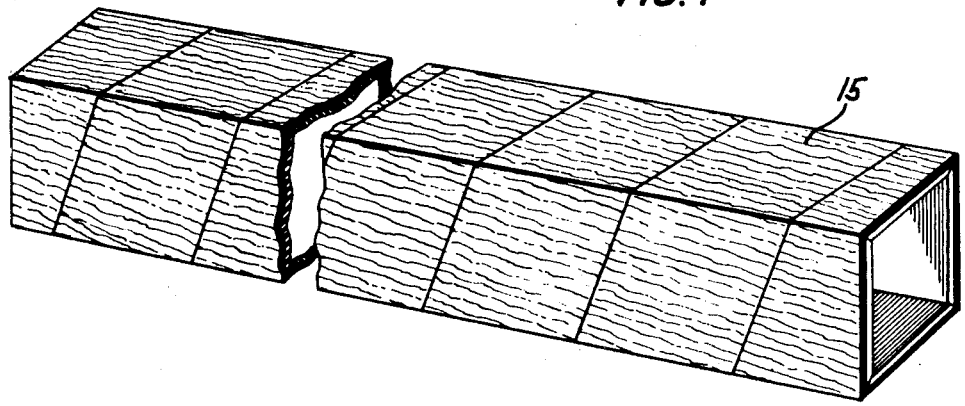

Referring now more in detail to the drawing, an elongated core is shown in Fig. 1. In practice, it has been found convenient to make a core for a number of coils in one piece, place the core on a mandrel and wind the coils thereon; and after the coils are wound, the core is cut into sections corresponding to the number of coils wound thereon.

Figure 3:
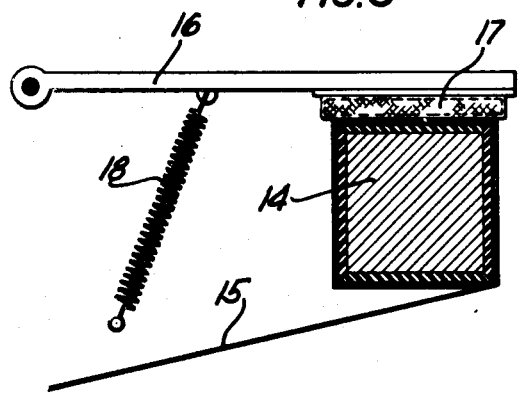
Fig. 3 is a detail view showing the application of a spiral covering on the core.
Figure 2:
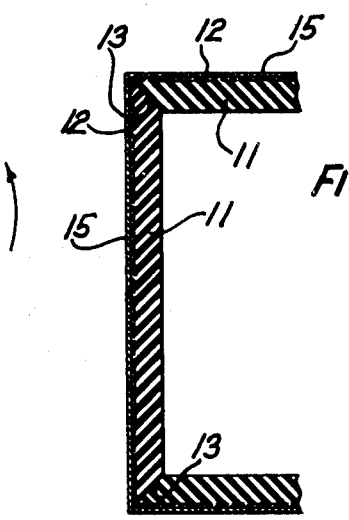
Fig. 2 is an enlarged fragmentary cross-sectional view of the core shown in Fig. 1.

The core illustrated in Figs. 1 to 3 comprises a plurality of side members 11 which may be made of a phenol condensation product, or for a more economical construction the side members may consist of a laminated structure comprising a plurality of sheets of fibrous material impregnated with phenol varnish and molded together to form the side members 11. Each side member in the preferred form of the invention has on its outer surface a facing of cellulose acetate which may be either a sheet of pure cellulose acetate or a fibrous sheet impregnated with cellulose acetate. In order to adhere the cellulose acetate sheet to the phenol fiber sheet, a sheet impregnated with a mixture comprising a solution of cellulose acetate and phenol varnish may be interposed between the cellulose acetate sheet and phenol fiber sheet and the assembly subjected to heat and pressure to form a unitary structure.

The method of facing a phenol fiber sheet with a sheet of cellulose acetate is more fully disclosed in the copending application of Willard P. Worrell and Francis E. Gruber, Serial No. 597,962, filed March 10, 1932.

The side members 11 are preferably provided with bevelled edges and in assembling the core the bevelled edges are placed in abutting relation whereby the edges of the cellulose acetate facings will be in contact. In accordance with one method of assembling the side members in the form of a core, the side members may be clamped on a rotatable mandrel 14. When the side members have been assembled on the mandrel, a strip of paper 15 impregnated with cellulose acetate is spirally wrapped around the core. The side of this strip which contacts with the core has an adhesive comprising cellulose acetate dissolved in any suitable solvent, such as acetone applied thereto. The solvent in this solution also plasticizes the cellulose acetate facing on the side members 11 and causes the strip to adhere firmly thereto. Some of the dissolved cellulose acetate also penetrates between the bevelled edges 13 of the phenol fiber side members 11 and forms a seal therebetween. The edges of the cellulose acetate facings will also be plasticized and adhere together to form a seal along the edges of the core. As shown in Fig. 3, the rotatable mandrel 14 may have an arm 16 associated therewith which carries an electrically heated plate 17. This plate is held in engagement with the mandrel by means of a spring 18. As the mandrel is rotated, the arm 16 will oscillate and cause the plate 17 to iron the strip firmly against the side members and accelerate the evaporation of the solvent in the adhesive. The strip of paper 15 impregnated with cellulose acetate is dry and may be wound on a supply reel (not shown). The adhesive is preferably applied to the strip just prior to its application to the core.

Figure 4:
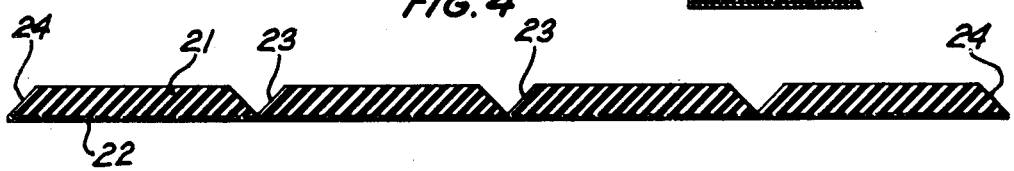
Fig. 4 is a sectional view of the elements of a modified form of core prior to forming the core.
Figure 5:
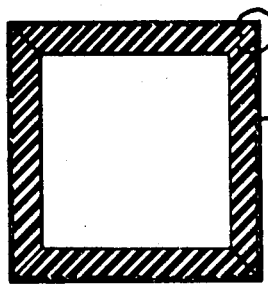
Fig. 5 is a cross-sectional view of the form of core shown in Fig. 4.

Figs. 4 and 5 illustrate a modified form of the invention in which a large sheet of material 21 of a phenol condensation product or phenol varnish impregnated fiber is faced with cellulose acetate 22 or a fibrous sheet impregnated with cellulose acetate. Grooves 23 are cut longitudinally in the sheet 21, and the side edges 24 of the sheet are bevelled. In order to form the grooved sheet into a core, the sheet is laid on a hot platen to plasticize the cellulose acetate sheet 22, which renders this sheet flexible and plastic and the sheet is then bent into the form shown in Fig. 5, in which the bevelled edges 24 contact and these edges will be held together by the coalescing of the cellulose acetate sheet along these edges.

The term "phenol fiber" or "phenol impregnated fiber" is used in the specification and claims to designate a fibrous material impregnated with a phenol condensation product and similarly the term "phenol varnish" is used to designate a varnish having as an ingredient thereof a phenol condensation product.

It will be evident that other coalescent substances, as, for example, cellulose nitrate, may be used in the facings of the side members and in the adhesive. It will be understood that while specific embodiments of the invention have been disclosed, many changes and modifications may be made therein without departing from the spirit and scope of the invention.

What is claimed is:

1. A core comprising side members having bevelled, abutting edges, and an integral outer covering.

2. A core comprising side members having bevelled, abutting edges, and means extending over the outer perimeter of the core and united therewith to form a substantially rigid body.

3. A core comprising side members having bevelled, abutting edges, and means forming the outer surface of the core for retaining said edges in abutting relation.

4. A core comprising side members having abutting edges, and a coalescible outer covering for uniting said members.

5. A method of making a core which comprises forming side members with bevelled edges, assembling the side members with said edges in abutting relation, providing a coalescent covering around the core, and coalescing said covering to unite said members.

6. A method of making a core which comprises forming side members with bevelled edges, assembling said members in the form of a core, and serving an adhesive wrapping on said core.

7. A method of making a core which comprises forming side members having bevelled edges, facing said members with a coalescent material, plasticizing said material, and coalescing said material, to form a core.

8. A core comprising side members having abutting edges, and an adhesive covering over said members forming a core.

9. A core comprising side members having abutting edges and assembled in the form of a core, and an adhesive covering served spirally thereover.

10. A core comprising abutting side members of phenol impregnated fiber faced with cellulose acetate impregnated fiber, the cellulose acetate impregnated fiber being coalesced along the abutting edges.

11. A core comprising abutting members of a phenol derivative faced with a cellulose derivative, wherein the cellulose derivative faces are coalesced together.

12. A core comprising members having abutting bevelled edges, each member comprising a sheet of phenol fiber faced with a sheet of cellulose acetate, and a covering of a sheet of cellulose acetate coalesced to said facings.

13. A method of making a core which comprises forming side members of a phenol derivative and faced with cellulose acetate, assembling said members with their edges abutting, applying a solution of cellulose acetate to a strip of material impregnated with cellulose acetate, and serving said strip over the core to coalesce the cellulose acetate facings.

14. A core comprising members having abutting edges, means forming a seal between said edges, and means for holding said edges in abutting relation.

15. A core comprising side members having abutting edges and assembled in the form of a core, a coalescible facing on said side members coalesced along said edges, and an adhesive covering served spirally thereover.

16. A core comprising side members having abutting edges and assembled in the form of a core, a coalescible facing on said side members, and an adhesive covering served circumferentially thereover.

17. A rectangular open ended core comprising sides of phenol fiber sheet material, a coating of cellulose acetate on said sheet material and a wrapping of cellulose acetate impregnated fibrous material about said sides.

18. A method of making a core which comprises facing one side of a sheet of material with a layer of thermoplastic material, cutting V-shaped grooves through said sheet of material to form beveled side members of a core, heating said thermoplastic layer, bending the layer along the lines of said grooves in the sheet material to form a core, and securing the outer edges of the sheet together.

FRED E. HENDERSON.

DISCLAIMER 1,959,426.—*Fred E. Henderson*, Riverside, Ill. CORE AND A METHOD OF MAKING CORES. Patent dated May 22, 1934. Disclaimer filed May 2, 1936, by the patentee; the assignee, *Western Electric Company, Inc.*, assenting and concurring.

Hereby enters this disclaimer to claims 1, 2, 3, 8, and 14 in the specification.
[*Official Gazette May 26, 1936.*]